US010740102B2

(12) United States Patent
Khaleque et al.

(10) Patent No.: US 10,740,102 B2
(45) Date of Patent: Aug. 11, 2020

(54) HARDWARE MECHANISM TO MITIGATE STALLING OF A PROCESSOR CORE

(71) Applicant: Oracle International Corporation, Redwood City, CA (US)

(72) Inventors: Munsefar Khaleque, Plano, TX (US); Nathan Sheeley, Austin, TX (US); Mark Greenberg, Austin, TX (US); Matthew Smittle, Allen, TX (US); Paul Jordan, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 15/441,411

(22) Filed: Feb. 24, 2017

(65) Prior Publication Data

US 2018/0246720 A1 Aug. 30, 2018

(51) Int. Cl.
*G06F 9/30* (2018.01)
*G06F 9/38* (2018.01)

(52) U.S. Cl.
CPC ........ *G06F 9/3009* (2013.01); *G06F 9/30021* (2013.01); *G06F 9/3802* (2013.01); *G06F 9/3836* (2013.01); *G06F 9/3867* (2013.01)

(58) Field of Classification Search
None
See application file for complete search history.

(56) References Cited

U.S. PATENT DOCUMENTS

| | | | | |
|---|---|---|---|---|
| 7,725,685 | B2 | 5/2010 | Floyd | |
| 7,748,001 | B2 | 6/2010 | Burns | |
| 7,818,544 | B2 * | 10/2010 | Abernathy | G06F 9/524 712/219 |
| 7,886,131 | B1 | 2/2011 | Kang | |
| 8,537,832 | B2 | 9/2013 | Pirog | |
| 8,560,812 | B2 * | 10/2013 | Wakabayashi | G06F 9/3851 712/214 |
| 2004/0215933 | A1 * | 10/2004 | Nguyen | G06F 9/3017 712/200 |
| 2016/0117191 | A1 | 4/2016 | Alexander | |

* cited by examiner

*Primary Examiner* — Corey S Faherty
(74) *Attorney, Agent, or Firm* — Kowert, Hood, Munyon, Rankin & Goetzel, P.C.

(57) ABSTRACT

An apparatus includes an execution unit, an instruction queue, and a control circuit. The control circuit may be configured to activate a plurality of processor threads. Each of the plurality of processor threads may include a respective plurality of instructions. The instruction queue may be configured to issue at least one instruction included in the plurality of processor threads to the execution unit at a first rate. The control circuit may also be configured to track, for a particular processor thread, a period of time from activating the particular processor thread. The instruction queue may be further configured to limit issue of a next instruction for at least one other processor thread to a second rate, based on a comparison of the period of time to a threshold amount of time. The second rate may be lower than the first rate.

20 Claims, 6 Drawing Sheets

500

Start
501

Activate a plurality of threads for processing
502

Issue instructions for active threads at first rate
504

Track time for each active thread
506

Time-out for any active thread?
508 no yes

Issue instructions for threads at second rate
510

End
512

300 time 0

| Thread 320 | Fetch Buffer 305 | | | |
|---|---|---|---|---|
| 320a | A | B | C | |
| 320b | D | E | | |
| 320c | F | G | H | I |
| ⋮ | | | | |

time 1 time 2

400 time 0

Thread 420
Fetch Buffer 405
420a A B C
420b D E
420c F G H I time 1 time 2

HARDWARE MECHANISM TO MITIGATE STALLING OF A PROCESSOR CORE

BACKGROUND

Field of the Invention

The embodiments herein relate to processors and, more particularly, to a method for management of an instruction pipeline in a processing core.

Description of the Related Art

Some processors include one or more processing cores (or simply, "cores") that support multi-threaded instruction execution. In a multi-threaded core, at least some hardware resources within the core may be shared between two or more software threads by assigning the resources to a currently selected thread. The selected thread may change on a given core clock cycle, allowing another thread access to the core's hardware resources. As used herein, a "software thread," "processor thread," or simply "a thread," refers to a smallest portion of a software application or process that may be managed independently by a core. Multi-threaded operation may allow a core to utilize processor resources more efficiently. For example, if an instruction in a first thread is waiting for a result of a memory access, processor resources may be assigned to a second thread rather than waiting for the result for the first thread.

One particular hardware resource that may be shared is the instruction processing pipeline, or as referred to herein, "the processing pipeline." The processing pipeline of a multi-threaded core may concurrently include instructions for two or more threads. Systems and algorithms for managing operation of a multi-threaded processing pipeline will be disclosed.

SUMMARY

Various embodiments of a system, a method and an apparatus are disclosed in which an embodiment of the apparatus includes an execution unit, an instruction queue, and a control circuit. The control circuit may be configured to activate a plurality of processor threads. Each processor thread of the plurality of processor threads may include a respective plurality of instructions. The instruction queue may be configured to issue at least one instruction included in the plurality of processor threads to the execution unit at a first rate. For a particular processor thread of the plurality of processor threads, the control circuit may also be configured to track a period of time from activating the particular processor thread. The instruction queue may be further configured to limit issue of a next instruction for at least one other processor thread of the plurality of processor threads to a second rate, based on a comparison of the period of time to a threshold amount of time. The second rate may be lower than the first rate.

In another embodiment, the instruction queue may be further configured to limit issue of a next instruction included in each processor thread of the plurality of processor threads to the second rate based on the comparison of the period of time to the threshold amount of time. In a further embodiment, the instruction queue may be further configured to return issue of a next instruction included in each processor thread of the plurality of processor threads to the first rate, in response to a determination that two or more instructions from each processor thread have issued within the threshold amount of time since limiting the issue of the next instruction included in each processor thread to the second rate.

In one embodiment, the instruction queue may be further configured to return issue of a next instruction included in the at least one other processor thread to the first rate, in response to determining that two or more instructions from the particular processor thread have issued within the threshold amount of time since limiting the issue of a next instruction to the second rate. In an embodiment, a counter circuit may be included. The control circuit may be further configured to reset a count value in the counter circuit to an initial value in response to an issue of a next instruction of the particular processor thread.

In a further embodiment, the counter circuit may be configured to assert a timeout signal in response to a determination that the count value crossed a threshold count value. In another embodiment, the instruction queue may be further configured to limit issue of a next instruction included in the at least one other processor thread to the second rate in response to the assertion of the timeout signal.

BRIEF DESCRIPTION OF THE DRAWINGS

The following detailed description makes reference to the accompanying drawings, which are now briefly described.

Figure 1:
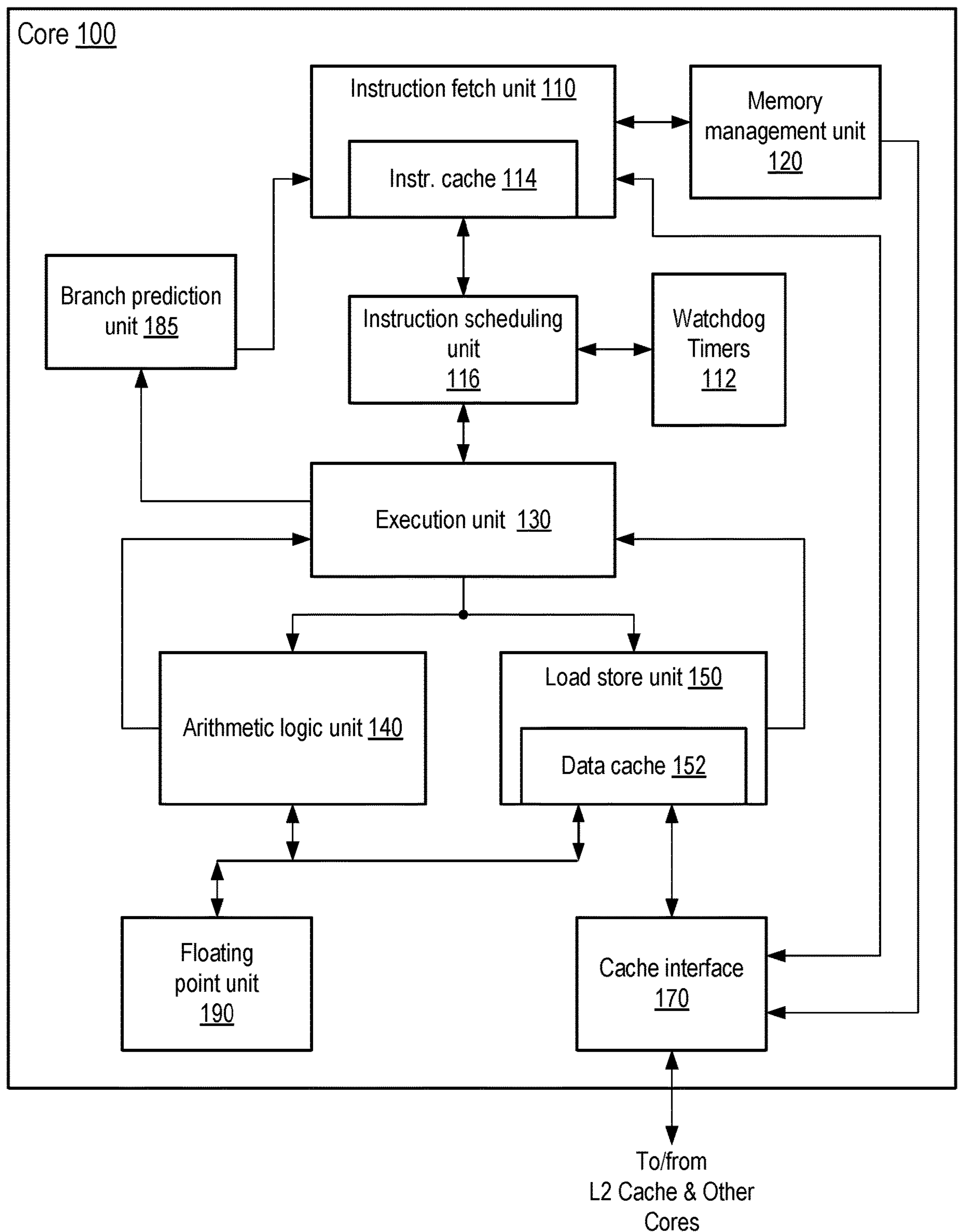
FIG. 1 illustrates a block diagram of an embodiment of a processing core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The processing pipeline of a multi-threaded core may concurrently include instructions and data for two or more processor threads. In the processing pipeline of a multi-threaded core, an instruction may be "retrieved" or "fetched" from an instruction cache, or other memory, and stored in a buffer included in the processing pipeline. Fetched instructions may be issued to an execution unit of the core for processing. In a multi-threaded core, the execution unit may be capable of receiving two or more instructions for each processor thread the core is able to process concurrently. It is possible that an unforeseen combination of activities on one or multiple threads can cause one thread of the core to become obstructed or "starved" due to execution of the instructions of a another thread or combination of threads. Should this starvation persist, hardware or software may conclude the affected thread's obstruction will not resolve and declare it "hung". Since other threads also being processed by the core may also become hung, or at least slowed, a declaration of a hang generally results in more threads, or worst case, all threads, in the hung core may cease to execute further instructions until the hung core becomes cleared, for example, by resetting the core, which may cause the execution for each thread to restart from an initial or previously saved state.

The concept of a processor "pipeline" is well understood, and refers to the concept of splitting the "work" a processor performs on instructions into multiple stages. In one embodiment, instruction decode, dispatch, execution, and retirement (i.e., commit) may be examples of different pipeline stages. Many different pipeline architectures are possible with varying orderings of elements/portions. Various pipeline stages perform such steps on an instruction during one or more processor clock cycles, then pass the instruction and/or operations associated with the instruction on to other stages for further processing.

The concept of "execution" is broad and may refer to 1) processing of an instruction throughout an execution pipeline (e.g., through fetch, decode, execute, and commit stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Approaches for detecting and mitigating performance impact from a starved thread are disclosed herein. The presented embodiments may provide systems, methods, and apparatus for determining that execution of instructions for a particular thread are not executing at an expected rate, and, in response, alter operation of the core to compensate before hardware or software declares the core to be hung.

An embodiment of a core is illustrated in FIG. 1. In the illustrated embodiment, core 100 corresponds to a multi-threaded processing core. Core 100 includes instruction fetch unit (IFU) 110, coupled to memory management unit (MMU) 120, branch prediction unit (BPU) 185, cache interface 170, and instruction scheduling unit (ISU) 116. ISU 116 is coupled to execution unit 130. Execution unit 130 is coupled to arithmetic logic unit (ALU) 140, and load store unit (LSU) 150. ALU 140 and LSU 150 are also coupled to send data back to execution unit 130. Both ALU 140 and LSU 150 are coupled to floating point unit (FPU) 190. IFU 110, MMU 120, and LSU 150 are coupled to cache interface 170.

Instruction fetch unit (IFU) 110 may be configured to retrieve instructions for execution in core 100. In the illustrated embodiment, IFU 110 is configured to perform various operations relating to the fetching of instructions from cache or memory, and the decoding of instructions prior to the instructions being issued for execution. Instruction fetch unit 110 includes instruction cache 114. In one embodiment, IFU 110 includes logic to maintain fetch addresses (e.g., derived from program counters) corresponding to each thread being executed by core 100, and to coordinate the retrieval of instructions from instruction cache 114 according to those fetch addresses. In one embodiment, IFU 110 is configured to maintain a pool of fetched, ready-for-issue instructions drawn from among each of the threads being executed by core 100. For example, IFU 110 may implement a respective instruction buffer corresponding to each thread in which several recently-fetched instructions from the corresponding thread may be stored.

Instruction scheduling unit (ISU) 116 may be configured to retrieve instructions for execution in core 100. In the illustrated embodiment, ISU 116 is configured to select instructions for various threads from instruction cache 114 for execution. In some embodiments, ISU 116 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, ISU 116 may be configured to further prepare instructions for execution, for example by detecting scheduling hazards, arbitrating for access to contended resources, or the like.

Watchdog timers 112, in the illustrated embodiment, are used to track an amount of time between instructions being issued for a given thread. ISU 116 initializes a particular timer circuit in watchdog timers 112 when an instruction for a corresponding thread is issued. Upon a next instruction from the corresponding thread issuing, ISU 116 resets the particular timer circuit to its initial count value. If the particular timer circuit crosses a threshold count value before a next instruction from the corresponding thread issues, then the particular thread asserts a timeout signal. In response to the assertion of the timeout signal, ISU 116 may limit a number of instructions that are issued for the corresponding thread. In some embodiments, the number of instruction issued may be limited for all active threads in the core. Further details regarding the watchdog timers and ISU 116 will be provided below.

Execution unit 130 may be configured to process and provide results for certain types of instructions issued from ISU 116. In one embodiment, execution unit 130 may be configured to execute certain integer-type instructions defined in the implemented ISA, such as arithmetic, logical, and shift instructions. It is contemplated that in some embodiments, core 100 may include more than one execution unit 130, and each of the execution units may or may not be symmetric in functionality. Each execution unit 130 may be capable of processing a given thread. In the illustrated embodiment, instructions destined for ALU 140 or LSU 150 pass through execution unit 130. In alternative embodiments, however, it is contemplated that such instructions may be issued directly from ISU 116 to their respective units without passing through execution unit 130.

Branch prediction unit (BPU) 185 may include logic to predict branch outcomes and/or fetch target addresses. BPU 185 may use a Branch History Table (BHT) to track a number of times an instruction branch is taken versus how often the instruction branch is not taken. BPU 185 may also track patterns of taking or not taking a particular branch. Using the data collected in the BHT, BPU 185 may populate a Branch Target Buffer (BTB) with predictions of branches to be taken or not taken.

Arithmetic logic unit (ALU) 140 may be configured to execute and provide results for certain arithmetic instructions defined in the implemented ISA. For example, in one embodiment, ALU 140 implements integer arithmetic instructions, such as add, subtract, multiply, divide, and population count instructions. In one embodiment, ALU 140 implements separate processing pipelines for integer add/multiply, divide, and Boolean operations, while in other embodiments the instructions implemented by ALU 140 may be differently partitioned.

In the illustrated embodiment, floating point unit 190 is implemented separately from ALU 140 to process floating-point operations while ALU 140 handles integer and Boolean operations. FPU 190 implements single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. In other embodiments, ALU 140 and FPU 190 may be implemented as a single logic block.

Load store unit 150 may be configured to process data memory references, such as integer and floating-point load and store instructions as well as memory requests that may originate from other blocks within core 100. LSU 150 includes a data cache 152 as well as logic configured to detect cache misses and to responsively request data from an L2 cache via cache interface 170. In one embodiment, data cache 152 is configured as a write-through cache in which all stores are written to L2 cache regardless of whether they hit in data cache 152; in some such embodiments, stores that miss in data cache 152 cause an entry corresponding to the store data to be allocated within data cache 152. In other embodiments, data cache 152 is implemented as a write-back cache.

A number of functional units in the illustrated embodiment of core 100 may be configured to generate memory or I/O requests external to core 100. For example, IFU 110 or LSU 150 may generate access requests to an L2 cache in response to their respective cache misses. In the illustrated embodiment, cache interface 170 is configured to provide a centralized interface to the port of an L2 cache on behalf of the various functional units that may generate memory accesses. In one embodiment, cache interface 170 is also configured to receive data returned via an L2 cache, and to direct such data to the appropriate functional unit (e.g., data cache 152 for a data cache fill due to miss). Cache interface 170 may, in some embodiments, be coupled to other cores in a multicore processor.

It is noted that, as used herein, "committing" or to "commit" an instruction refers to processing of an instruction including the instruction being executed, completed, and results of the instruction being saved in an appropriate memory and available for use by a subsequent instruction. In some embodiments, to "commit" an instruction is the same as to "retire" an instruction. In the embodiments presented herein, an instruction is not committed until all previously received instructions have been committed. Accordingly, an instruction issued out-of-order may have to wait until the previous instructions are committed before being committed itself.

The embodiment of the core illustrated in FIG. 1 is one of multiple contemplated examples. Other embodiments of a core may include a different number and configuration of components. For example, ALU 140 and FPU 190 may be implemented as a single functional block rather than two separate units.

Figure 2:
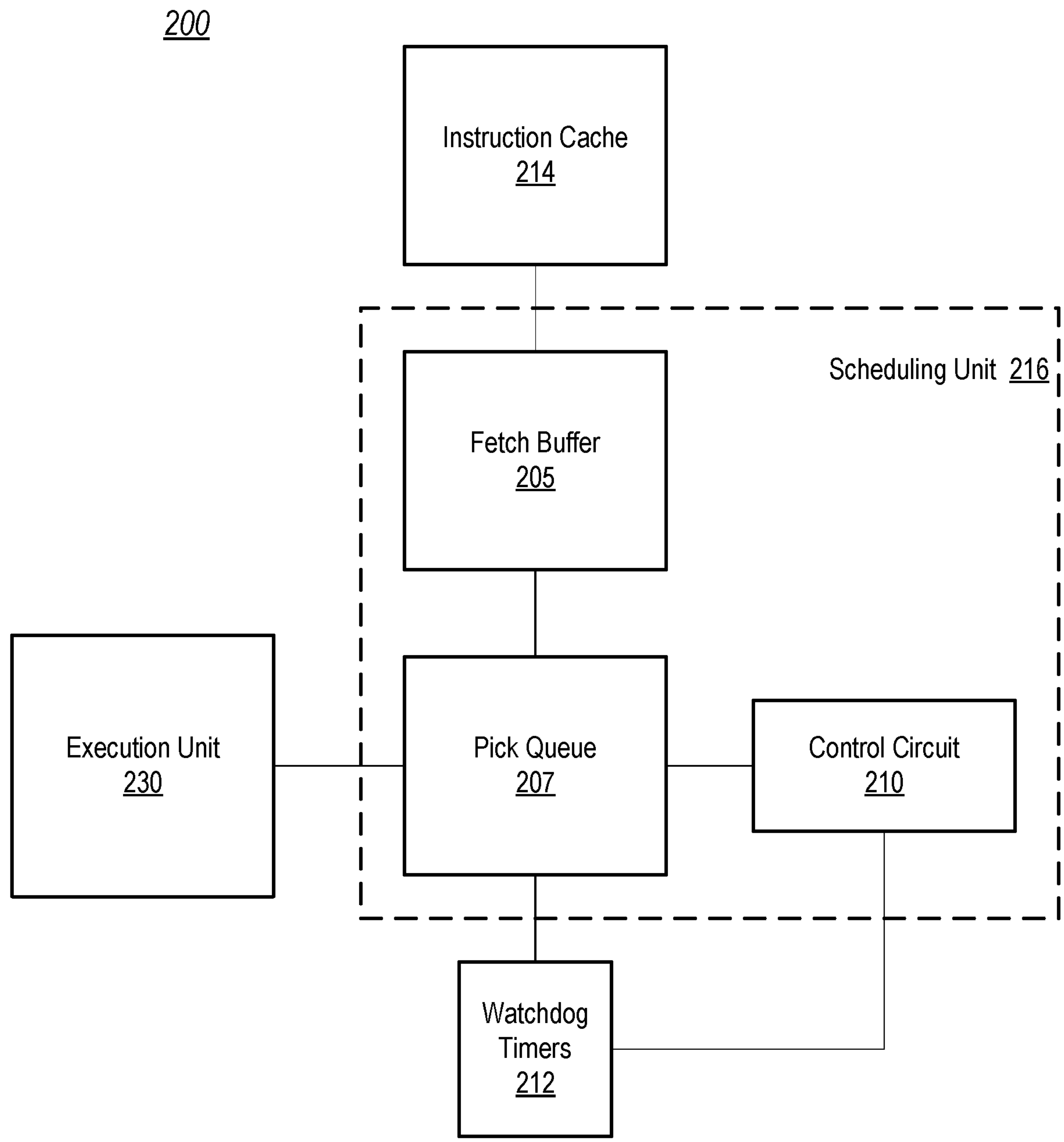
FIG. 2 shows a block diagram of an embodiment of an instruction pipeline included in a processing core.

Moving to FIG. 2, a block diagram of an embodiment of a processing pipeline for a multi-threaded core is shown. In some embodiments, processing pipeline 200 may be part of core 100 in FIG. 1, and in such embodiments, some circuit blocks correspond to their similarly named and numbered circuit blocks in FIG. 1. Processing pipeline 200 includes instruction cache 214 coupled to fetch buffer 205. Pick queue 207 is coupled to fetch buffer 205, control circuit 210, watchdog timers 212, and execution unit 230. In some embodiments, fetch buffer 205, pick queue 207, and control circuit 210 may be included within scheduling unit 216.

In the illustrated embodiment, instruction cache 214 corresponds to instruction cache 114 in FIG. 1, and, therefore, corresponds to the functional description provided above. Instruction cache 214 may store instructions for a plurality of threads. The instructions stored in instruction cache 214 are processed by scheduling unit 216, which, in some embodiments, may correspond to instruction scheduling unit 116 in FIG. 1.

Fetch buffer 205 fetches and stores an instruction for a selected thread from instruction cache 214. In some embodiments, fetch buffer 205 may include a single memory storing multiple fetch buffers, with each fetch buffer storing instructions for a respective thread. In other embodiments, fetch buffer 205 may include multiple memories, each memory corresponding to a single fetch buffer.

Scheduling unit 216, in the illustrated embodiment, picks an instruction for a particular thread from fetch buffer 205. The picked instruction is decoded and then stored in pick queue 207. Similar to fetch buffer 205, pick queue 207 may be implemented as a single memory including multiple queues or multiple memories each including a single queue, or some combination thereof. Upon determining that execution unit 230 is ready to receive an instruction, control circuit 210 issues an instruction from pick queue 207 that corresponds to one of the active threads. Upon issuing the instruction, control circuit 210 initiates a timer circuit in watchdog timers 212, corresponding to the active thread that includes the issued instruction. When a next instruction included in the same active thread is issued to execution unit 230, control circuit 210 restarts the timer circuit in watchdog timers 212. Control circuit 210 repeats this process for each active thread, using a different timer circuit in watchdog timers 212 to correspond to each of the active threads. In various embodiments, control circuit 210 may include different combinations of one or more logic circuits, such as, for example, NAND, NOR, or inverter circuits. In some embodiments, control circuit 210 may include a state machine to perform operations disclosed herein.

Each timer circuit in watchdog timers 212 may compare its respective current count value to a threshold value each time the count value changes. In some embodiments, these threshold values may be set to fixed values, while in other embodiments, the threshold values may be set dynamically by executing an appropriate instruction or set of instructions. In various embodiments, the timer circuits may count up from an initial value, or down from the initial value, to the respective threshold value. Some embodiments may have an independent threshold value for each timer circuit, while other embodiments, may use a single threshold value for two or more of the timer circuits.

When a particular timer circuit of watchdog timers 212 reaches or crosses a corresponding threshold value, the particular timer circuit may assert a timeout signal. Assertion of a timeout signal may indicate that one or more previously issued instructions included in an active thread associated with the particular timer circuit has not completed execution in execution unit 230 within an allowable period of time. An active thread that is not demonstrating progress through execution unit 230 in the allowable period of time may be referred to as a "stalled" thread. Various conditions may result in a stalled thread, such as, for example, software bugs, hardware bugs, inaccessible memory, and the like.

The timeout signals generated by the timer circuits in watchdog timers 212 may be received or monitored by control circuit 210. Upon detecting an assertion of a timeout signal, control circuit 210, in the illustrated embodiment, limits issuing further instructions from the corresponding stalled thread. For example, control circuit 210 may wait until all previously issued instructions in the stalled thread have either been executed or have committed before issuing another instruction included in the stalled thread. Control circuit 210 may keep scheduling unit 216 in this conservative issuing mode until some number of instructions in the stalled thread issue within the allowable period of time. In some embodiments, control circuit 210 may limit issuance of instructions to all active threads if one thread stalls. In such cases, scheduling unit 216 may remain in the conservative issuing mode until at least one instruction from each of the active threads executes or commits in the allowable period of time.

It is noted that FIG. 2 is merely an example. Although fetch buffer 205 and pick queue 207 are shown as part scheduling unit 216, each may be separate from, but coupled to, scheduling unit 216. Similarly, although watchdog timers 212 is illustrated as a separate circuit from scheduling unit 216, watchdog timers 212 may be included as part of scheduling unit 216. Additional functional circuits may be included in other embodiments.

Figure 3:
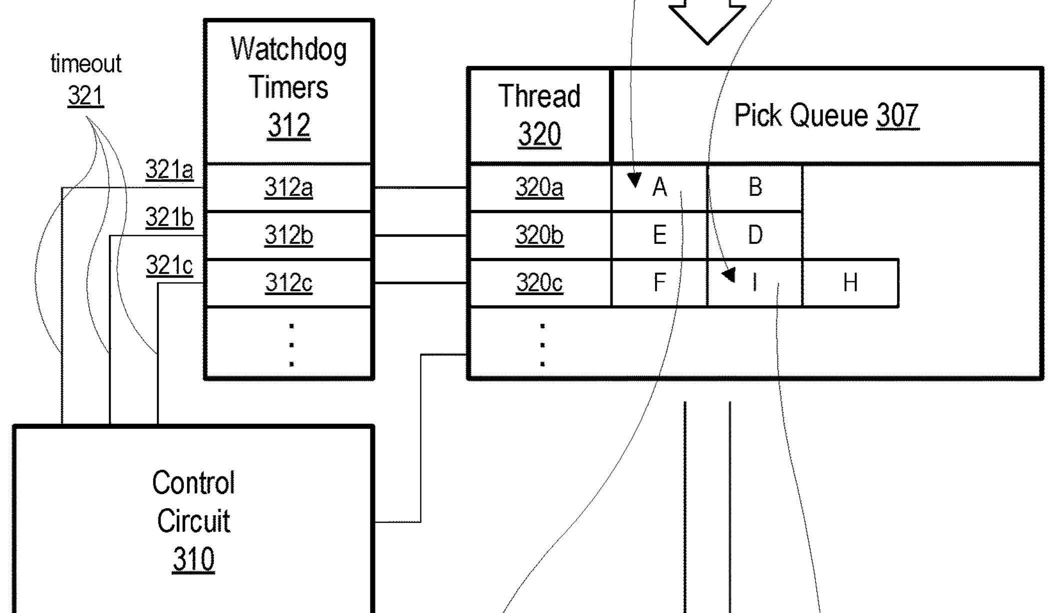
FIG. 3 depicts an example of instruction flow through an embodiment of a multi-threaded instruction pipeline.
Figure 3:
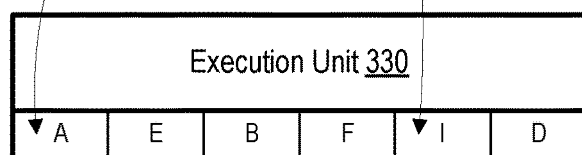

Turning to FIG. 3, an example of instruction flow through an embodiment of a multi-threaded instruction pipeline is depicted. Processing pipeline 300 includes fetch buffer 305, pick queue 307, and execution unit 330. Pick queue 307 is coupled to control circuit 310 and watchdog timers 312. Processing pipeline 300 may correspond to a portion of processing pipeline 200 in FIG. 2, with the blocks illustrated in FIG. 3 corresponding to the similarly named and numbered blocks in FIG. 2. FIG. 3 illustrates how instructions may flow through a processing pipeline from time 0 to time 2.

Fetch buffer 305 is illustrated at time 0 with instructions corresponding to three respective active threads (collectively referred to as threads 320) being stored therein. Thread 320*a* includes instructions A, B, and C, thread 320*b* includes instructions D and E, while thread 320*c* includes instructions F, G, H, and I. Instructions for a given thread 320 may be fetched and copied into fetch buffer 305 after each thread 320 has been activated. Fetch buffer 305 may include instructions from more active threads, however, three active threads are shown in the current example for clarity. As threads 320 are processed, instructions are moved out of fetch buffer 305 and into pick queue 307. As execution unit 330 executes instructions of threads 320, execution unit 330 may receive additional instructions issued from pick queue 307.

At time 1, instructions A and B from thread 320*a*, instructions E and D from thread 320*b*, and instructions F, I, and H from thread 320*c* have been moved into pick queue 307. It is noted that, in the illustrated embodiment, processing pipeline 300 is part of a processor core capable executing instructions out of order. In other words, pick queue 307 may select and issue instructions in a different order than they are received into fetch buffer 305. In other embodiments, processing pipeline 300 may be a part of an in-order processing core that maintains the execution order of instructions for each active thread.

Execution unit 330, in the illustrated embodiment, is capable of receiving multiple instructions from multiple threads. Execution unit 330 may be capable of receiving several instructions without a previous instruction having been executed or committed. At time 2, two instructions from each of threads 320 have been moved from pick queue 307 into execution unit 330.

Watchdog timers 312 includes timer circuits 312*a* through 312*c*. Upon pick queue issuing an instruction from one of threads 320 to execution unit 330, control circuit 310 initializes a corresponding timer circuit 312*a*-312*c* to an initial count value. As described above, watchdog timers may count up or down in various embodiments. Each of timer circuits 312*a*-312*c* may have a respective threshold value that is compared to a current count value each time the count value is updated. The period of time from when one of watchdog timers 312 is initialized to when the same watchdog timer 312 reaches its threshold value corresponds to an allowable period of time for issuing instructions. Each time pick queue 307 issues another instruction in a same thread 320, control circuit 310 initializes the corresponding watchdog timer 312 to the initial count value. For example, when pick queue 307 issues instruction A, control circuit 310 initializes timer circuit 312*a*, and timer circuit 312*a* starts incrementing towards the threshold value. Timer circuit 312*b* is initialized and started when instruction E is issued, and, similarly, timer circuit 312*c* is initialized and started when instruction F is issued. Control circuit 310 initializes timer circuit 312*a* back to the starting count value upon instruction B being issued. Likewise, control circuit 310 initializes timer circuit 312*b* when instruction D issues, and timer circuit 312*c* when instruction I issues.

If the count value of one of watchdog timers 312 reaches or crosses the threshold value before a next instruction in the corresponding thread 320 issues, then that watchdog timer 312 asserts its respective timeout signal 321. Continuing the example, if timer circuit 312*b* reaches its threshold value after instruction E is issued, but before instruction D is issued, then timer circuit 312*b* asserts timeout signal 321*b*. In response to the asserted timeout signal 321*b*, control circuit 310 may cause processor pipeline 300 to enter a conservative issuing mode in which pick queue 307 ceases to issue another instruction for either thread 320*a*, or thread 320*c*, or for all threads 320. Processor pipeline 300 may remain in this conservative issuing mode until one or more instructions included in thread 320*b* issue within the allowable period of time. In some embodiments, processor pipeline 300 may remain in the conservative issuing mode, until each of active threads 320 issues a next instruction within the allowable period of time. Operation of a processor pipeline in the conservative issuing mode is described in more detail in regards to FIG. 4, below.

It is noted that FIG. 3 is merely an example to demonstrate operation of an embodiment of a processing pipeline. Other functional circuits of a processing pipeline have been omitted from FIG. 3 for clarity. Although three active threads are illustrated, any suitable number of active threads may be supported in other embodiments.

Figure 4:
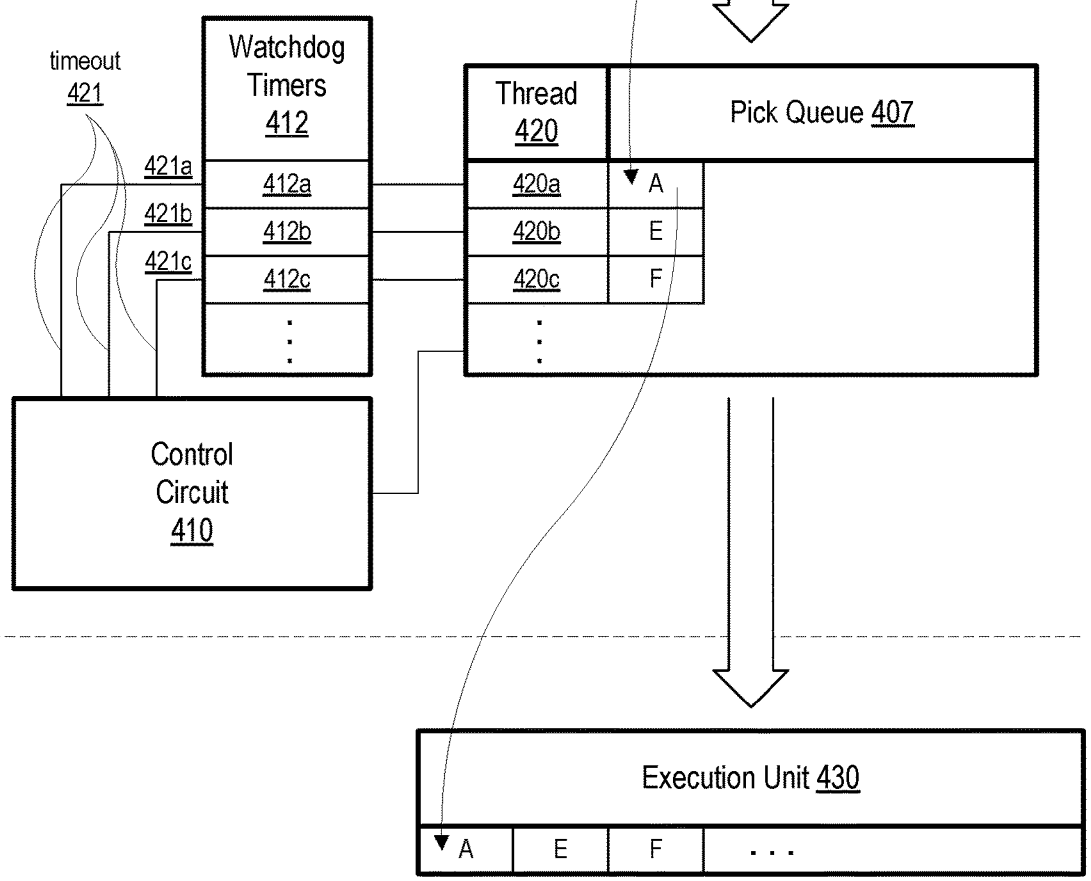
FIG. 4 illustrates another example of instruction flow through an embodiment of a multi-threaded instruction pipeline.

Moving now to FIG. 4, another example of instruction flow through an embodiment of a multi-threaded instruction pipeline is illustrated. Similar to processing pipeline 300 in FIG. 3, processing pipeline 400 depicts movement of instructions from fetch buffer 405 into pick queue 407, and from pick queue 407 into execution unit 430 from time 0 to time 2. Pick queue 407 is coupled to control circuit 410 and watchdog timers 412. Processing pipeline 400 may correspond to a portion of processing pipeline 200 in FIG. 2, with the blocks illustrated in FIG. 4 corresponding to the similarly named and numbered blocks in FIG. 2. In the illustrated embodiment, processing pipeline 400 is in a conservative issuing mode at time 0.

Similar to fetch buffer 305 in FIG. 3, fetch buffer 405 is illustrated at time 0 with instructions corresponding to three respective active threads (collectively referred to as threads 420) being stored therein. Thread 420*a* includes instructions A, B, and C, thread 420*b* includes instructions D and E, while thread 420*c* includes instructions F, G, H, and I. For clarity, three active threads are shown in the current example, however, fetch buffer 405 may include instructions from more active threads.

In the conservative issuing mode, pick queue 407 may retrieve a limited number of the instructions for each respective thread 420. In the illustrated example, one instruction from each of threads 420 is retrieved until it is issued and then replaced with a next instruction from the same thread 420. In other embodiments, pick queue 407 may store more than one instruction per thread 420 while in the conservative issuing mode. When execution unit 430 executes an instruction from a particular thread 420 and that instruction subsequently commits, pick queue 407 issues the next instruction in that thread 420 and then retrieves a next instruction from fetch buffer 405.

As illustrated, for example, pick queue 407 has retrieved instruction A from thread 420*a* from fetch buffer 405 by time 1. When execution unit 430 executes a previous instruction for thread 420*a* and the instruction subsequently commits, pick queue 407 issues instruction A to execution unit 430 at time 2. Pick queue 407 may also retrieve a next instruction, e.g., B, to be issued next. At time 2, when instruction A is issued to execution unit 430, control circuit 410 initializes timer circuit 412*a* in watchdog timers 412 and begins tracking an allowable period of time for issuing a next instruction for thread 420*a* (e.g., instruction B). If pick queue 407 issues instruction B to execution unit 430 before timer circuit 420*a* asserts its timeout signal 421, then control circuit 410 indicates that thread 412*a* has issued a new instruction within the allowable period of time, for example by setting a flag within control circuit 410.

In one embodiment, control circuit 410 may end the conservative issuing mode if the thread 420 that caused the entrance to the conservative issuing mode issues one or more consecutive instructions within the allowable period of time. In other embodiments, control circuit 410 may end the conservative issuing mode if all active threads 420 issue one or more instructions within the allowable period of time. In contrast, if any active thread 420 fails to issue an instruction within the allowable period of time, the respective timeout signal 421 is asserted and processing pipeline 400 remains in the conservative issuing mode.

It is noted that the tables of FIG. 4 are examples for demonstration purposes. Although three threads are illustrated, any suitable number of threads may be included. In other embodiments, additional functional blocks may be included in processor pipeline 400.

Figure 5:
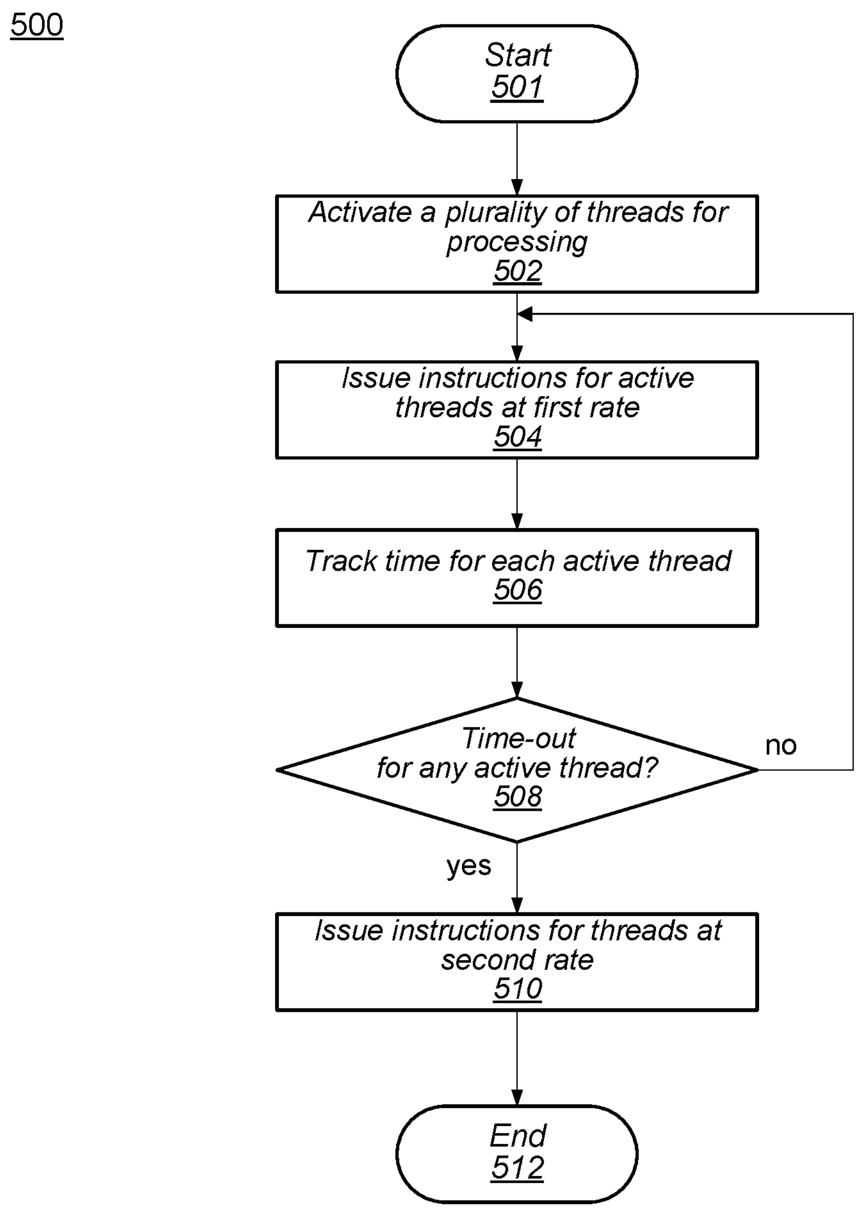
FIG. 5 shows a flow diagram of an embodiment of a method for detecting stalled threads in a multi-threaded processing pipeline.

Turning now to FIG. 5, a flow diagram of an embodiment of a method for detecting stalled threads in a multi-threaded processing pipeline is shown. Method 500 may be applied to a processing pipeline, such as, for example, processing pipeline 200 in FIG. 2. Referring collectively to processing pipeline 300 in FIG. 3 and the flow diagram of FIG. 5, method 500 begins in block 501.

A plurality of processing threads are activated (block 502). Logic circuits in processing pipeline 200, such as, for example, control circuit 210, may activate one or more threads at a time until a suitable number of threads are active. Under various conditions, the suitable number of active threads may correspond to a total number of threads processing pipeline 200 is capable of processing, or the suitable number may correspond to a number of processing threads to be processed at a given time.

Instructions are issued for the active threads at a first rate (block 504). Pick queue 207 may issue instructions for one or more active threads to execution unit 230 at the first rate. For example, the first rate may correspond to two or more instructions per thread issued without an instruction from the corresponding thread having been committed. Processing pipeline 200, in the illustrated embodiment, is operating in a mode in which each active thread may have two or more issued instructions concurrently.

A respective time is tracked for each active thread (block 506). In the illustrated embodiment, control circuit 210 initiates a timer circuit in watchdog timers 212 in response to a respective processing thread being activated. Each enabled timer circuit corresponds to one of the active threads. Upon a particular thread issuing a next instruction, the timer circuit corresponding to this thread is reset back to its initial count value. In various embodiments, each timer circuit may have a different initial value or all timer circuits may use the same initial value. Timer circuits may count up or down as determined by their design.

Further operations of method 500 may depend on the tracked times (block 508). Each timer circuit, upon changing its respective count value, may compare its current count value to a threshold value. If any of the timers reaches or crosses its respective threshold value, then that timer circuit may assert a timeout signal that is received by control circuit 210. In various embodiments, all timer circuits may be coupled to one timeout signal, or each timer circuit may be coupled to an individual timeout signal. If at least one timeout signal is asserted, then the method moves to block 510 to limit issuance of instructions for each thread. Otherwise, the method returns to block 504 to continue issuing instructions.

If a timeout signal was asserted, then instructions are issued for at least one active thread at a second rate (block 510). In response to the assertion of the timeout signal, control circuit 210 causes pipeline 200 to enter a conservative issuing mode in which instructions are issued at a second rate that is lower than the first rate. In the illustrated embodiment, in this conservative issuing mode, one instruction is issued until a previously issued instruction in the same thread is committed. Once a previously issued instruction commits, then a next instruction from the same thread may be issued. In some embodiments, issuing of instructions is limited to the second rate for all active threads. In other embodiments, a subset of the active threads may be limited to the second rate while instructions included in one or more other active threads, for example, a thread corresponding to a high priority process, continues to issue at the first rate. The method may end in block 512 to enter the conservative issuing mode.

It is noted that the method illustrated in FIG. 5 is an example embodiment. In other embodiments, additional operations may be included. Although the operations illustrated in method 500 are depicted as being performed in a sequential fashion, in other embodiments, some or all of the operations may be performed in parallel or in a different sequence.

Figure 6:
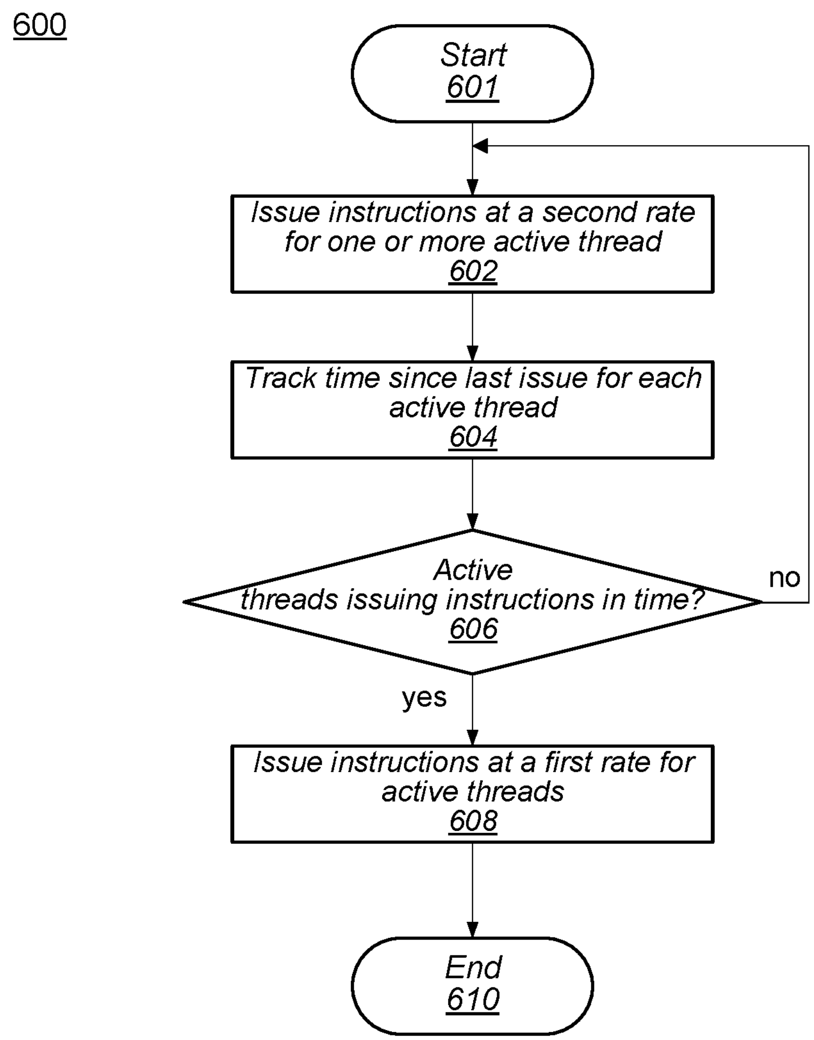
FIG. 6 depicts a flow diagram illustrating an embodiment of a method for detecting active threads that are no longer stalled in a multi-threaded processing pipeline.

Moving to FIG. 6, a flow diagram illustrating an embodiment of a method for detecting active threads that are no longer stalled in a multi-threaded processing pipeline is depicted. In the illustrated embodiment, method 600 discloses a process for issuing instructions in a conservative issuing mode, and may correspond to operations performed in block 510 of FIG. 5. Similar to method 500, method 600 may be applied to a processing pipeline, such as, for example, processing pipeline 200 in FIG. 2. Method 600 may be performed upon method 500 ending in block 512. Referring collectively to processing pipeline 200 in FIG. 2 and the flow diagram of FIG. 6, method 600 begins in block 601, with processing pipeline 200 in a conservative issuing mode.

Instructions are issued at the second rate for one or more active threads (block 602). In the illustrated embodiment, pick queue 207 issues one command per active thread to execution unit 230. After execution unit 230 executes an instruction in a particular thread and the instruction commits, then another instruction in the particular thread may be issued. In some embodiments, instructions for one or more active threads may continue to be issued at the first rate, for example if the one or more threads are related to a high priority process. In various embodiments, the second rate may allow for two or more instructions per active thread to be issued at a time. In such embodiments, however, the second rate is lower than the first rate.

For each active thread, a time period is tracked since issuing the last instruction (block 604). Control circuit 210 initiates a respective timer circuit in watchdog timers 212 for each active thread when the thread is activated. When an instruction is issued for an active thread, the count value for the respective timer circuit is reset to an initial value. Each timer circuit may count up or count down to a threshold value. The threshold value may be the same or different for each timer circuit.

Further operations of method 600 may depend on a determination if active threads have issued instructions within an allowable period of time (block 606). In the illustrated embodiment, control circuit 210 determines if any timer circuit has asserted its respective timeout signal before the respective active thread has issued a next instruction. If each of the active threads are issuing instructions within the allowable period of time, then the method moves to block 608 to issue additional instructions (i.e., more than one instruction between issue and commit for a given thread). Otherwise the method returns to block 602 to continue issuing a single instruction per thread.

If the active threads are issuing instructions within the allowable period of time, then instructions are issued at the first rate for the active threads (block 608). Control circuit 210 causes processing pipeline 200 to exit the conservative issuing mode. Pick queue 207 may issue more than one instructions for each active thread. Method 600 ends in block 610. In some embodiments, method 500 in FIG. 5 may be performed upon ending method 600.

It is noted that the method illustrated in FIG. 6 is an example for demonstrating the disclosed concepts. Operations are illustrated as occurring in a sequential fashion. In other embodiments, however, some of the operations may be performed in parallel or in a different sequence. Additional operations may be included in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:

a control circuit configured to activate at least first, second, and third processor threads, each of which has a corresponding priority level and includes a respective plurality of instructions;

an execution unit; and an instruction queue configured to issue at least one instruction included in the first, second and third processor threads to the execution unit at a first rate;

wherein, for the first processor thread, the control circuit is further configured to track a period of time from activating the first processor thread; and wherein the instruction queue is further configured to:

select the second processor thread based on the corresponding priority levels of the second processor thread and at least the third processor thread; and limit issue of at least a next instruction for the second processor thread to a second rate, lower than the first rate, based on a comparison of the period of time to a threshold amount of time.

2. The apparatus of claim 1, wherein the instruction queue is further configured to select the second processor thread in response to a determination that the priority level of the second processor thread is less than the priority level of the third processing thread.

3. The apparatus of claim 1, wherein the instruction queue is further configured to return issue of further instructions included in the second processor thread to the first rate in response to a determination that two or more instructions from each of the first, second, and third processor threads have issued within the threshold amount of time since limiting the issue of instructions included in the second processor thread to the second rate.

4. The apparatus of claim 1, wherein the instruction queue is further configured to return issue of further instructions included in the second processor thread to the first rate, in response to determining that two or more instructions from the first processor thread have issued within the threshold amount of time since limiting the issue of instructions included in the second processor thread to the second rate.

5. The apparatus of claim 1, further including a counter circuit, wherein the control circuit is further configured to reset a count value in the counter circuit to an initial value in response to an issue of a next instruction of the first processor thread.

6. The apparatus of claim 5, wherein the counter circuit is configured to assert a timeout signal in response to a determination that the count value crossed a threshold count value.

7. The apparatus of claim 6, wherein the instruction queue is further configured to limit issue of at least a next instruction for the second processor thread to the second rate in response to the assertion of the timeout signal.

8. A method for operating a processing core, comprising:

activating, by a processor core, at least first, second, and third processor threads for processing, each of which has a corresponding priority level and includes a respective plurality of instructions;

issuing, by an instruction queue in the processing core, at least one instruction included in the first, second, and third processor threads to an execution unit of the processing core at a first rate;

for the first processor thread, tracking, by a control circuit in the processor core, a period of time from activating the first processor thread;

selecting, by the instruction queue, the second processor thread based on a priority level of the second processor thread and at least a priority level of the third processor thread; and limiting, by the instruction queue, issue of at least a next instruction included in the second processor thread to a second rate, lower than the first rate, based on comparing the period of time to a threshold amount of time.

9. The method of claim 8, wherein selecting the second processor thread comprises selecting the second processor thread in response to determining that the priority level of the second processor thread is less than a particular priority level.

10. The method of claim 8, further comprising returning issue of further instructions included in the second processor thread to the first rate in response to determining that two or more consecutive instructions from each of the first, second, and third processor threads have issued within the threshold amount of time since limiting the issue of instructions included in the second processor thread to the second rate.

11. The method of claim 8, further comprising returning issue of further instructions included in the second processor thread to the first rate, in response to determining that two or more instructions from the first processor thread have issued within the threshold amount of time since limiting the issue of instructions included in the second processor thread to the second rate.

12. The method of claim 8, further comprising resetting a count value in a counter circuit to an initial value in response to an issue of a next instruction of the first processor thread.

13. The method of claim 12, further comprising asserting, by the counter circuit, a timeout signal in response to determining that the count value crossed a threshold count value.

14. The method of claim 13, further comprising limiting issue of at least a next instruction for the second processor thread to the second rate in response to the assertion of the timeout signal.

15. A system, comprising:

a memory configured to store a plurality of instructions included in at least first, second, and third processor threads, each of which has a corresponding priority level and includes a respective subset of the plurality of instructions;

a processing core configured to:

fetch, from the memory, at least one instruction from the plurality of instructions in response to activating the first, second, and third processor threads;

issue at least one of the fetched instructions at a first rate;

track a period of time from activating the first processor thread;

select the second processor thread based on the corresponding priority level of the second processor thread and at least a priority level of the third processor thread; and limit issue of at least a next instruction for the second processor thread to a second rate, lower than the first rate, based on a comparison of the period of time to a threshold amount of time.

16. The system of claim 15, wherein the processing core is further configured to select the second processor thread in response to a determination that the priority level of the second processor thread is less than the priority level of the third processing thread.

17. The system of claim 15, wherein the processing core is further configured to return issue of further instructions included in the second processor thread to the first rate in response to a determination that two or more instructions from each of the first, second, and third processor threads have issued within the threshold amount of time since limiting the issue of instructions included in the second processor thread to the second rate.

18. The system of claim 15, wherein the processing core is further configured to return issue of further instructions included in the second processor thread to the first rate, in response to determining that two or more instructions from the first processor thread have issued within the threshold amount of time since limiting the issue of instructions included in the second processor thread to the second rate.

19. The system of claim 15, wherein the processing core includes a counter circuit, and wherein the processing core is further configured to reset a count value in the counter circuit to an initial value in response to an issue of a next instruction of the first processor thread.

20. The system of claim 19, wherein the counter circuit is configured to assert a timeout signal in response to a determination that the count value crossed a threshold count value, and wherein the processing core is further configured to limit issue of at least a next instruction for the second processor thread to the second rate in response to the assertion of the timeout signal.

* * * * *